Jan. 19, 1937.  E. H. HAUX  2,068,104
APPARATUS FOR MAKING CURVED SAFETY GLASS
Filed Feb. 23, 1935  3 Sheets-Sheet 1

INVENTOR.
E. H. HAUX
BY Bradley + Bee
ATTORNEYS.

Jan. 19, 1937. E. H. HAUX 2,068,104
APPARATUS FOR MAKING CURVED SAFETY GLASS
Filed Feb. 23, 1935 3 Sheets-Sheet 2

INVENTOR.
E. H. HAUX
BY Bradley & Bee
ATTORNEYS.

Jan. 19, 1937. E. H. HAUX 2,068,104
APPARATUS FOR MAKING CURVED SAFETY GLASS
Filed Feb. 23, 1935  3 Sheets-Sheet 3
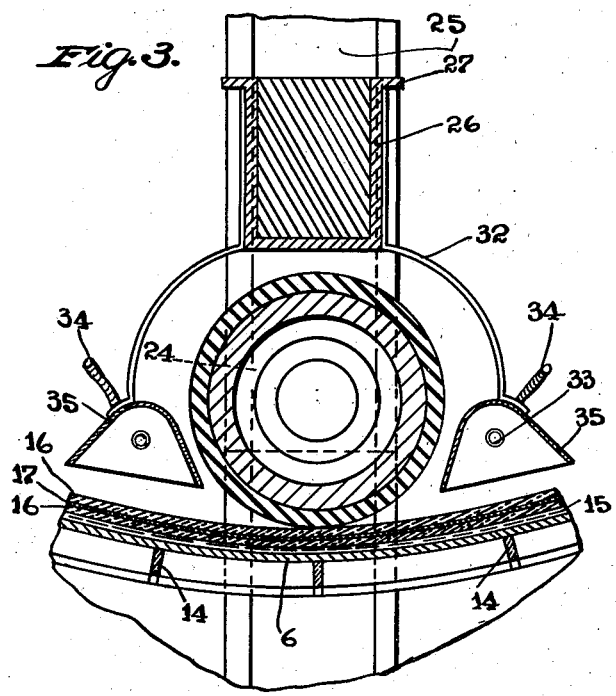
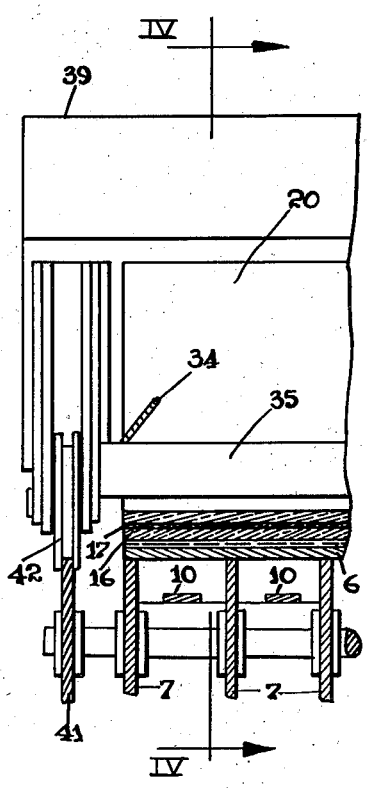
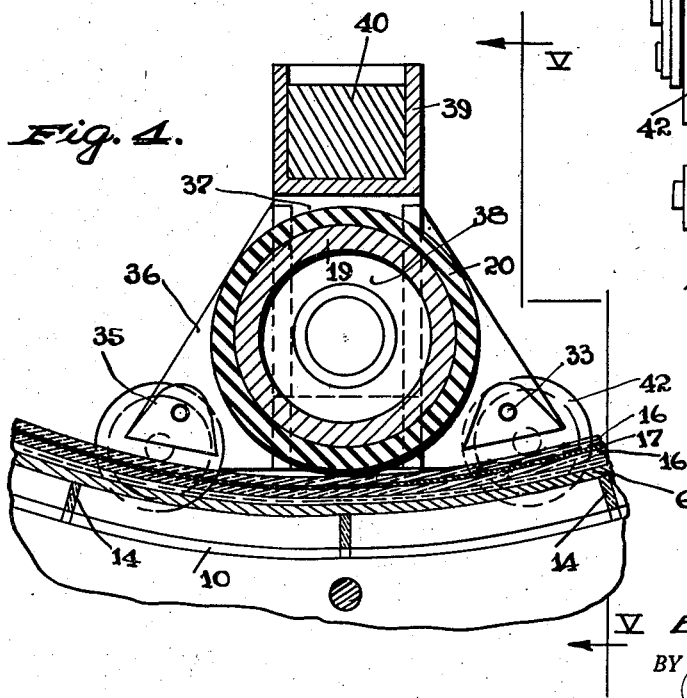
INVENTOR.
E. H. HAUX
BY Bradley & Bee
ATTORNEYS.

Patented Jan. 19, 1937

2,068,104

UNITED STATES PATENT OFFICE 2,068,104

APPARATUS FOR MAKING CURVED SAFETY GLASS

Elmer H. Haux, Tarentum, Pa., assignor to Duplate Corporation, a corporation of Delaware Application February 23, 1935, Serial No. 7,892

9 Claims. (Cl. 18—17)

Figure 1:
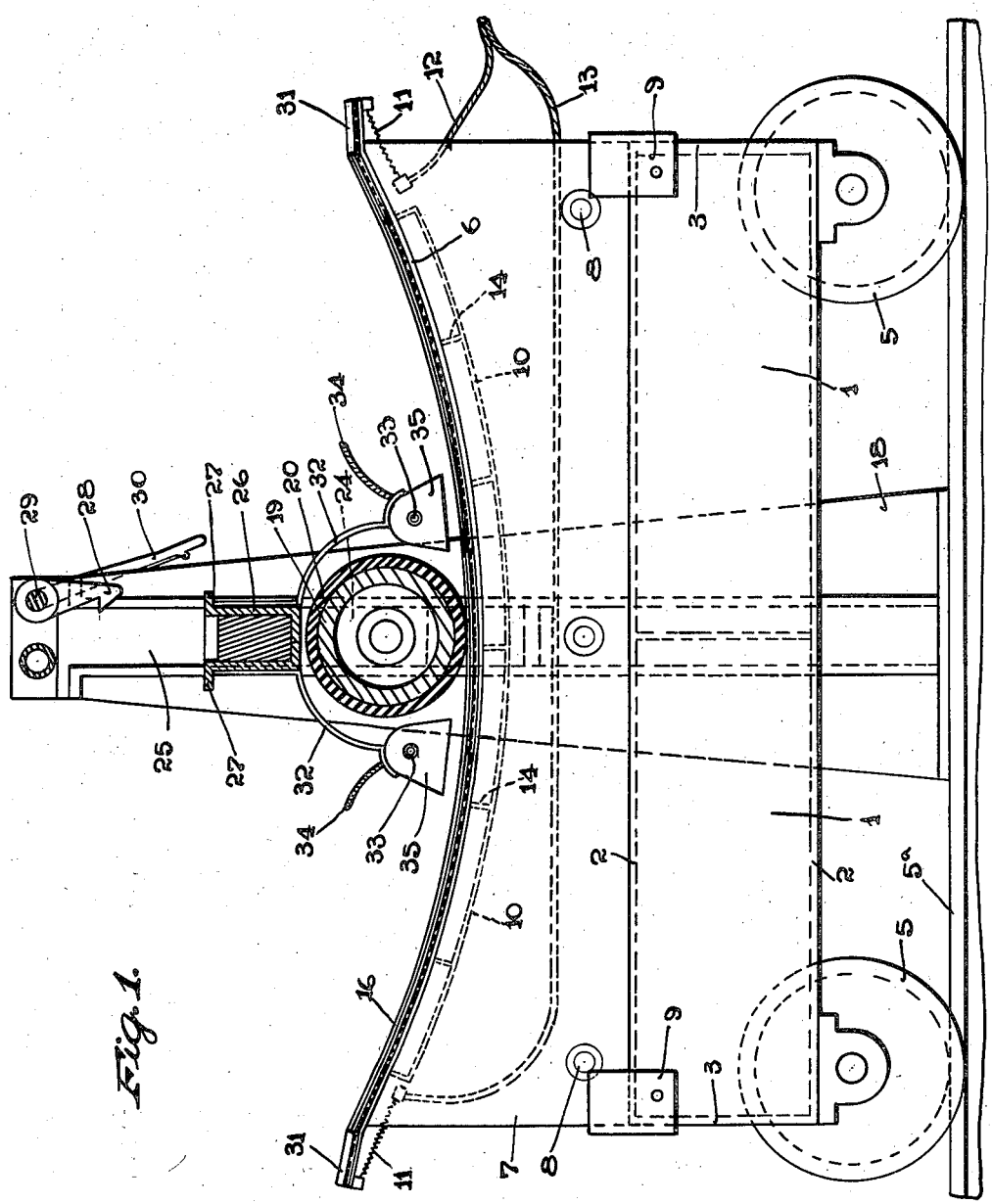
Figure 2:
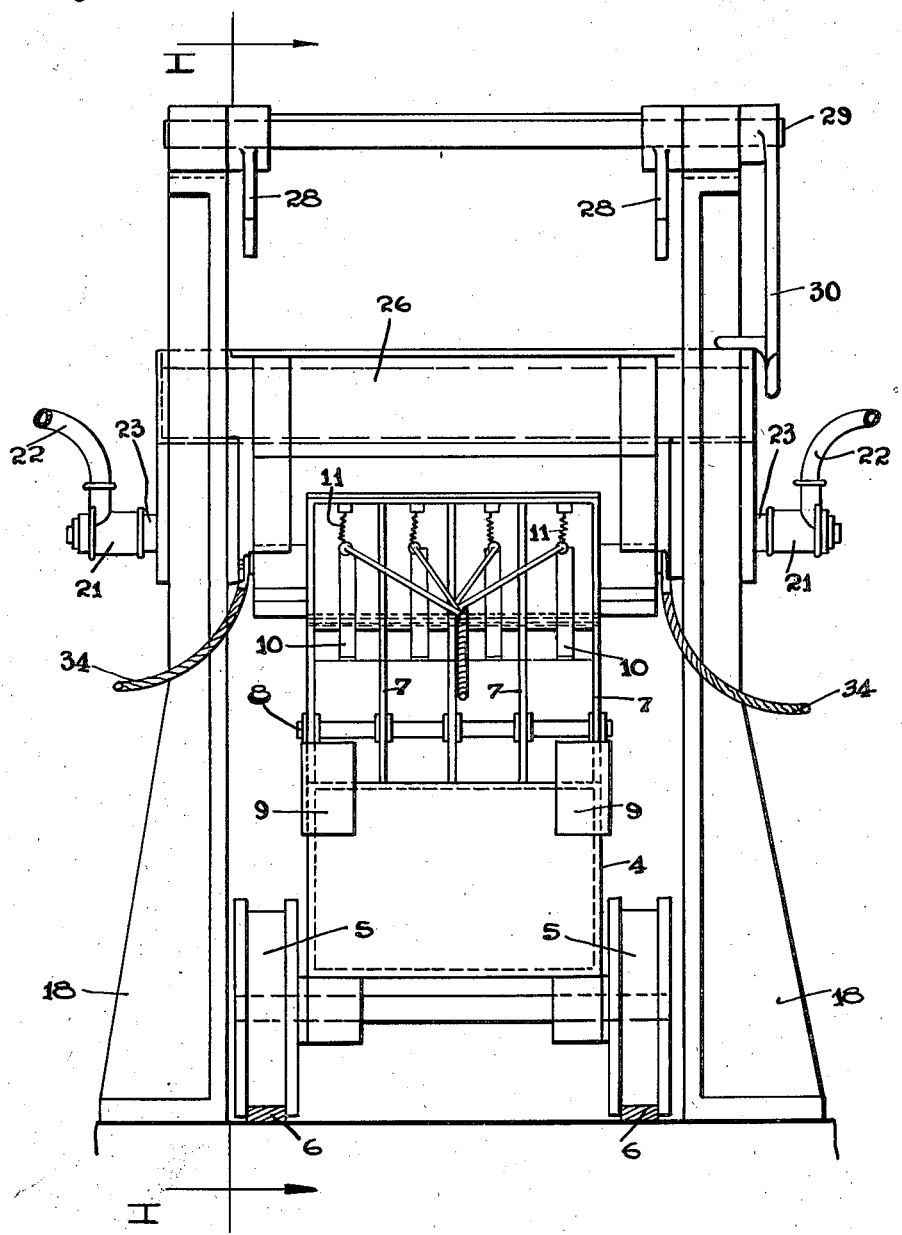

The invention relates to apparatus for laminating sheets of glass and reinforcing material in the production of curved safety glass, such glass consisting ordinarily of two sheets of glass with an interposed sheet of reinforcing cemented or otherwise secured together by the application of heat or pressure. Heretofore this operation has been accomplished by placing the assembled sandwich in a rubber container and subjecting it to hydraulic pressure in a tank of hot liquid. The object of the present invention is the provision of improved apparatus for applying the necessary heat and pressure without the use of the rubber containers. In most cases, the apparatus is used only to preliminarily secure the sheets together, the final pressing being accomplished in a hydraulic tank in which the sandwiches are exposed directly to heated liquid under high pressure, but in other cases the apparatus may be employed to completely and finally laminate the sandwiches. Certain embodiments of the invention are illustrated in the accompanying drawings, wherein:

Figure 1 is a vertical section through the apparatus on the line I—I of Fig. 2. Fig. 2 is an end view of the apparatus. Fig. 3 is a partial section on the line I—I of Fig. 2 on an enlarged scale. And Figs. 4 and 5 are detail views showing a modification, Fig. 4 being a section on the line IV—IV of Fig. 5; and Fig. 5 being a section on the line V—V of Fig. 4.

Referring to the construction as shown in Figs. 1 to 3, 1 is the body of the car or table formed of the plates 2, 2, 3, 3, and 4, 4 suitably secured together and mounted upon the wheels 5 which ride upon the track 5a. Seated removably upon the table body is a table top which constitutes the mold or form upon which the sheets to be laminated are supported. This top consists of a plate 6 (Fig. 3) of sheet metal which is bent to the same contour as the sheets that are to be laminated and a plurality of stiffening ribs 7, 7, 7, 7, 7 (Fig. 2) secured at their upper edges to the plate 6, preferably by welding, and tied together at their lower portions by the three transverse rods 8. In order to prevent the top from sliding relative to the body of the table, an angle 9 is secured at each corner of the table into which the corner of the top fits. This permits the top to be lifted vertically and removed when it is desired to substitute a new top having a different curvature.

In order to heat the top plate 6, a plurality of resistance ribbons 10, 10, 10, 10 are mounted beneath the plate in spaced relation thereto. These ribbons are maintained under tension by means of the springs 11, and current is supplied for heating them by means of the leads 12 and 13. The ribbons are spaced away from the plate 6 by means of the bars 14 which are notched to receive them. The top of the table is supplied with a cushioning means, preferably the sheet of copper mesh 15 (Fig. 3), which will readily transmit the heat to the sheets to be laminated.

As indicated in Fig. 3, the sandwich to be laminated consists of a pair of glass sheets 16, 16 with an interposed layer of reinforcing material 17. This reinforcing material may vary widely in character, the material commonly employed being cellulose plastic which will adhere to the glass upon the application of heat and pressure, the cement commonly used being gelatin. In other cases, the interlayer may be of a character which does not require the use of cement, but in all cases, the application of heat and pressure is necessary in order to secure a proper bond between the interlayer and the glass sheets.

Secured to the floor on each side of the track 6 is a vertical standard 18 which carries the presser roll. This roll ordinarily consists of a metal shell 19 having a rubber cover 20 and provided with swivels 21, 21 (Fig. 2) at the ends of the axles through which steam is supplied through the connections 22, 22. The axles 23 at the ends of the rolls are mounted in rectangular bearing blocks 24 and these blocks slide freely in vertical slideways 25, which are provided in the standards, so that the roll is free to move vertically as the table moves back and forth in order to secure a compressive action upon the sandwich from end to end. Extending longitudinally of the roll and secured at its ends to the bearing blocks is a box 26 preferably filled with lead in order to secure the right amount of pressure between the bearing roll and the sandwich to be laminated. This box is provided with flanges 27, one of which serves as a retainer when the roll is elevated to its highest position at the end of the table. The means for holding the roll at this elevated position consists of a pair of latches 28 mounted upon the shaft 29 which has at one end the hand operated lever 30. Automatic means are thus provided for securing the supports of the roll after the laminating operation is completed, and the roll reaches its highest position at one end of the table, at which time the laminated sandwich is removed and another one placed upon the table. In order to prevent the sandwich from slipping endwise on the table during the pressing operation, a pair of stop members 31 are provided, such stop members being in the form of plates which are secured releasably to the top of the table by screws or other suitable clamping means.

In order to apply additional heat to the sandwich and thus speed up the laminating operation, the box 26 is provided with depending brackets 32 carrying heaters. These heaters are in the form of resistance rods 33 supplied from the leads 34 and enclosed in the parabolic reflectors 35. This heating means, in connection with the ribbons 10 and the heated roller, provides for a rapid and uniform heating of the sandwich from both sides during the pressing operation in order to soften the cement and the interlayer so that a satisfactory lamination is secured.

In operation, the top or mold is provided with a sandwich to be laminated and the table is moved back and forth beneath the presser roll until the sheets are secured together, the time of lamination and the number of times which the roll must be carried over the sandwich being dependent upon the character of the interlayer, the pressure exerted by the roll and the thickness of the glass. After the lamination is completed, the table is moved so that the roll lies at one end thereof and is held in elevated position by means of the latch 28. The finished plate may now be removed and a new sandwich supplied and the operation repeated, the handle 30 being operated to release the latch 28. The finished plate may now be removed and a new sandwich supplied and the operation repeated, the handle 30 being operated to release the latch 28.

Figs. 4 and 5 illustrate a modification which differs from that of Figs. 1, 2 and 3 in that the table is made stationary and the presser roll is mounted for movement longitudinally of the table. In this case, a guide frame 36 is provided at each end of the roll, such guide frame having a vertical slot 37, in which the bearing block 38 that carries the roll axle is mounted. The frames 36 are tied together by means of the boxes 39 filled with lead 40. Mounted at each side of the table is a curved guide track 41 which is engaged by a pair of rollers 42 carried by the frame 36. As in the other form of construction, a pair of transverse reflectors 35 are employed carrying heating elements 33, such reflectors being carried by the frames 36. In other respects the construction follows that of Figs. 1 to 3 and similar parts are similarly numbered. The operation is also as heretofore described in connection with Figs. 1 and 3, except that the roll is moved back and forth along the stationary table, instead of moving the table beneath the roll.

What I claim is:

1. In apparatus for making safety glass made up of curved sheets of glass and an interposed sheet of reinforcing material, a table and a presser roll thereover mounted so that one of such parts is movable horizontally, said roll having a guided movement vertically and the top of the table which receives the sheets and which is of metal being curved to correspond to the curvature of the glass sheets, means beneath the table top for heating it and the assembled sheets carried thereby, and means for pressing the roll downward upon the sheets carried upon the table.

2. In apparatus for making safety glass made up of curved sheets of glass and an interposed sheet of reinforcing material, a table and a presser roll thereover mounted so that one of such parts is movable horizontally, said roll having a guided movement vertically and the top of the table which receives the sheets and which is of metal being curved to correspond to the curvature of the glass sheets, means beneath the table top for heating it and the assembled sheets carried thereby, means for heating the roll, and means for pressing the roll downward upon the sheets carried upon the table.

3. In apparatus for making safety glass made up of curved sheets of glass and an interposed sheet of reinforcing material, a table and a presser roll thereover mounted so that one of such parts is movable horizontally, said roll having a guided movement vertically and the top of the table which receives the sheets and which is of metal being curved to correspond to the curvature of the glass sheets, electrically heated resistance means beneath the table top for heating it and the assembled sheets carried thereby, and means for pressing the roll downward upon the sheets carried upon the table.

4. In apparatus for making safety glass made up of curved sheets of glass and an interposed sheet of reinforcing material, a table and a presser roll thereover mounted so that one of such parts is movable horizontally, said roll having a guided movement vertically and the top of the table which receives the sheets and which is of metal being curved to correspond to the curvature of the glass sheets, means beneath the table top for heating it and the assembled sheets carried thereby, a fixed support above the roll, a latch carried thereby, means movable with the roll for engaging the latch when the roll occupies a position at the extreme end of the table, and means for pressing the roll downward upon the sheets carried upon the table.

5. In apparatus for making safety glass made up of curved sheets of glass and an interposed sheet of reinforcing material, a table and a presser roll thereover mounted so that one of such parts is movable horizontally, said roll having a guided movement vertically and the top of the table which receives the sheets and which is of metal being curved to correspond to the curvature of the glass sheets, means beneath the table top for heating it and the assembled sheets carried thereby, and means for pressing the roll downward upon the sheets carried upon the table, said top being in the form of a plate provided on its lower side with a plurality of spaced stiffening ribs extending longitudinally thereof.

6. In apparatus for making safety glass made up of curved sheets of glass and an interposed sheet of reinforcing material, a table and a presser roll thereover mounted so that one of such parts is movable horizontally, said roll having a guided movement vertically and the top of the table which receives the sheets and which is of metal being curved to correspond to the curvature of the glass sheets, means beneath the table top for heating it and the assembled sheets carried thereby, and means for pressing the roll downward upon the sheets carried upon the table, said top being removable from the table and being in the form of a sheet metal plate, provided on its lower side with a plurality of spaced stiffening ribs extending longitudinally thereof.

7. In apparatus for making safety glass made up of curved sheets of glass and an interposed sheet of reinforcing material, a table mounted for horizontal movement and having a curved top corresponding in curvature to the curvature of the glass sheets, fixed standards at the sides of the table provided with vertical guideways, a presser roll extending transversely of the table, bearings for the ends of the roll slidably mounted in the guideways, means for heating the table top, and means for pressing the roll downward upon the sheets carried upon the table.

8. In apparatus for making safety glass made up of curved sheets of glass and an interposed sheet of reinforcing material, a table and a presser roll thereover mounted so that one of such parts is movable horizontally, said roll having a guided movement vertically and the top of the table which receives the sheets and which is of metal being curved to correspond to the curvature of the glass sheets, means beneath the table top for heating it and the assembled sheets carried thereby, heating means above the table top in proximity thereto movable with the presser roll, and means for pressing the roll downward upon the sheets carried upon the table.

9. In apparatus for making safety glass made up of curved sheets of glass and an interposed sheet of reinforcing material, a table and a presser roll thereover mounted so that one of such parts is movable horizontally, said roll having a guided movement vertically and the top of the table which receives the sheets and which is of metal being curved to correspond to the curvature of the glass sheets, means beneath the table top for heating it and the assembled sheets carried thereby, reflectors above the table top in proximity thereto extending transversely of the top and movable with the roll, electrical heating elements mounted in the reflectors, and means for pressing the roll downward upon the sheets carried upon the table.

ELMER H. HAUX.